(12) United States Patent
Shafer et al.

(10) Patent No.: US 12,323,391 B2
(45) Date of Patent: Jun. 3, 2025

(54) VIRTUAL PRIVATE NETWORKS FOR SIMILAR PROFILES

(71) Applicant: International Business Machines Corporation, Armonk, NY (US)

(72) Inventors: Steven Leslie Shafer, Poughkeepsie, NY (US); Robert Simon, Staatsburg, NY (US); Mathew Accapadi, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 17/653,879

(22) Filed: Mar. 8, 2022

(65) Prior Publication Data
US 2023/0291710 A1    Sep. 14, 2023

(51) Int. Cl.
*H04L 9/40*    (2022.01)
(52) U.S. Cl.
CPC ........ *H04L 63/0272* (2013.01); *H04L 63/102* (2013.01)
(58) Field of Classification Search
CPC .......................... H04L 63/0272; H04L 63/102
See application file for complete search history.

(56) References Cited

U.S. PATENT DOCUMENTS

| | | | | |
|---|---|---|---|---|
| 9,438,564 | B1* | 9/2016 | Weng | H04L 63/0281 |
| 10,320,753 | B1* | 6/2019 | Ashley | H04L 63/0272 |
| 11,290,478 | B2* | 3/2022 | Weingarten | H04L 67/34 |
| 11,563,767 | B1* | 1/2023 | Rodriguez | H04L 63/1483 |
| 11,979,379 | B2* | 5/2024 | Nosalis | H04L 67/141 |
| 2003/0032409 | A1 | 2/2003 | Hutcheson et al. | |
| 2003/0041050 | A1 | 2/2003 | Smith | |
| 2005/0055578 | A1* | 3/2005 | Wright | G06F 21/32 726/4 |
| 2009/0276314 | A1* | 11/2009 | Gorodyansky | H04L 63/0272 705/14.69 |
| 2010/0205057 | A1 | 8/2010 | Hook | |

(Continued)

OTHER PUBLICATIONS

Burgess., "Chrome's Cookie Update Is Bad for Advertisers but Good for Google", Wired UK, Security Feb, 3, 2021, 5 Pgs, <https://www.wired.com/story/chrome-cookie-update-advertisers-google/>.

(Continued)

*Primary Examiner* — Javier O Guzman
(74) *Attorney, Agent, or Firm* — Stosch Sabo

(57) ABSTRACT

Described are techniques for grouping user profiles onto Virtual Private Networks (VPNs) including a computer-implemented method comprising creating a user profile at a VPN manager and associating the user profile with a set of demographically similar user profiles based on characteristics of the user profile. The computer-implemented method further comprises assigning the user profile to least one VPN server that is associated with the set of demographically similar user profiles. The computer-implemented method further comprises providing encrypted internet access to a device associated with the user profile via the at least on VPN server. The computer-implemented method further comprises transmitting resources to the device associated with the user profile via the at least one VPN server, where the resources are customized for the set of demographically similar user profiles.

20 Claims, 6 Drawing Sheets

(56) References Cited

U.S. PATENT DOCUMENTS

| | | | | |
|---|---|---|---|---|
| 2011/0041168 | A1 | 2/2011 | Murray | |
| 2011/0314145 | A1* | 12/2011 | Raleigh | H04L 12/1496 709/224 |
| 2013/0067023 | A1* | 3/2013 | Joy | H04L 63/0421 709/217 |
| 2014/0128105 | A1* | 5/2014 | Su | H04W 4/021 455/456.3 |
| 2016/0019585 | A1* | 1/2016 | Carroll | G06Q 30/0255 705/14.51 |
| 2018/0367340 | A1* | 12/2018 | Shaw | H04L 12/4633 |
| 2019/0334872 | A1* | 10/2019 | Wang | G06Q 30/0277 |
| 2020/0089848 | A1* | 3/2020 | Abdelaziz | H04L 63/1441 |
| 2020/0329048 | A1* | 10/2020 | Bhattacharya | H04L 63/0272 |
| 2020/0336464 | A1* | 10/2020 | Hastings | H04L 9/0841 |
| 2020/0344213 | A1* | 10/2020 | Gorsica, IV | G06F 21/606 |
| 2021/0099431 | A1* | 4/2021 | Wasicek | G06F 21/6263 |
| 2022/0141190 | A1* | 5/2022 | Olson | H04L 63/0272 726/15 |

OTHER PUBLICATIONS

Elvy, "Paying for privacy and the personal data economy." New York Law School, Colum. L. Rev. 117 (2017): 1369, 93 Pgs, <digitalcommons.nyls.edu>.

Gaul; "Virtual Private Network (VPN) Market Treads & Industry Analysis—2027", Dec. 2020, 11 Pgs, <https://www.alliedmarketresearch.com/virtual-private-network-market>.

Ikram et al. "An analysis of the privacy and security risks of android vpn permission-enabled apps." Proceedings of the 2016 Internet Measurement Conference. Nov. 14-16, 2016, Santa Monica, CA, USA © ACM: ISBN:978-1-4503-4526-2/16/11, 16 Pgs, <http://dx.doi.org/10.1145/2987443.2987471>.

Mell et al., "The NIST Definition of Cloud Computing", National Institute of Standards and Technology, Special Publication 800-145, Sep. 2011, 7 pages.

Selby, "Online Browser Privacy" MacQuarie University, Downloaded Feb. 23, 2022, 15 Pgs.

Slattery;, "The Future of VPNs in a Post-Pandemic World", TechTarget, 4 Pgs, Download Feb. 24, 2022, <https:www.techtarget.com/searchnetworking/tip/The-tuture-of-VPNs-in-a-post-pandemic-world>.

Sombatruang et al. "Attributes affecting user decision to adopt a Virtual Private Network (VPN) app." International Conference on Information and Communications Security. Springer, Cham, 2020., arXiv:2008.06813v1 [cs.CR] Aug. 16, 2020, 19 Pgs.

* cited by examiner

VIRTUAL PRIVATE NETWORKS FOR SIMILAR PROFILES

BACKGROUND

The present disclosure relates to Virtual Private Networks (VPNs), and, more specifically, to VPNs for similarly user profiles.

VPNs provide users online privacy, anonymity, and security by creating a private network from a public internet connection. VPNs can obscure a user's Internet Protocol (IP) address, thereby making online actions less traceable. Additionally, VPNs can be encrypted connections, thereby increasing the security of any transmitted data.

SUMMARY

Aspects of the present disclosure are directed toward a computer-implemented method for grouping user profiles onto Virtual Private Networks (VPNs), the computer-implemented method comprising creating a user profile at a VPN manager and associating the user profile with a set of demographically similar user profiles based on characteristics of the user profile. The computer-implemented method further comprises assigning the user profile to least one VPN server that is associated with the set of demographically similar user profiles. The computer-implemented method further comprises providing encrypted internet access to a device associated with the user profile via the at least on VPN server. The computer-implemented method further comprises transmitting resources to the device associated with the user profile via the at least one VPN server, where the resources are customized for the set of demographically similar user profiles.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
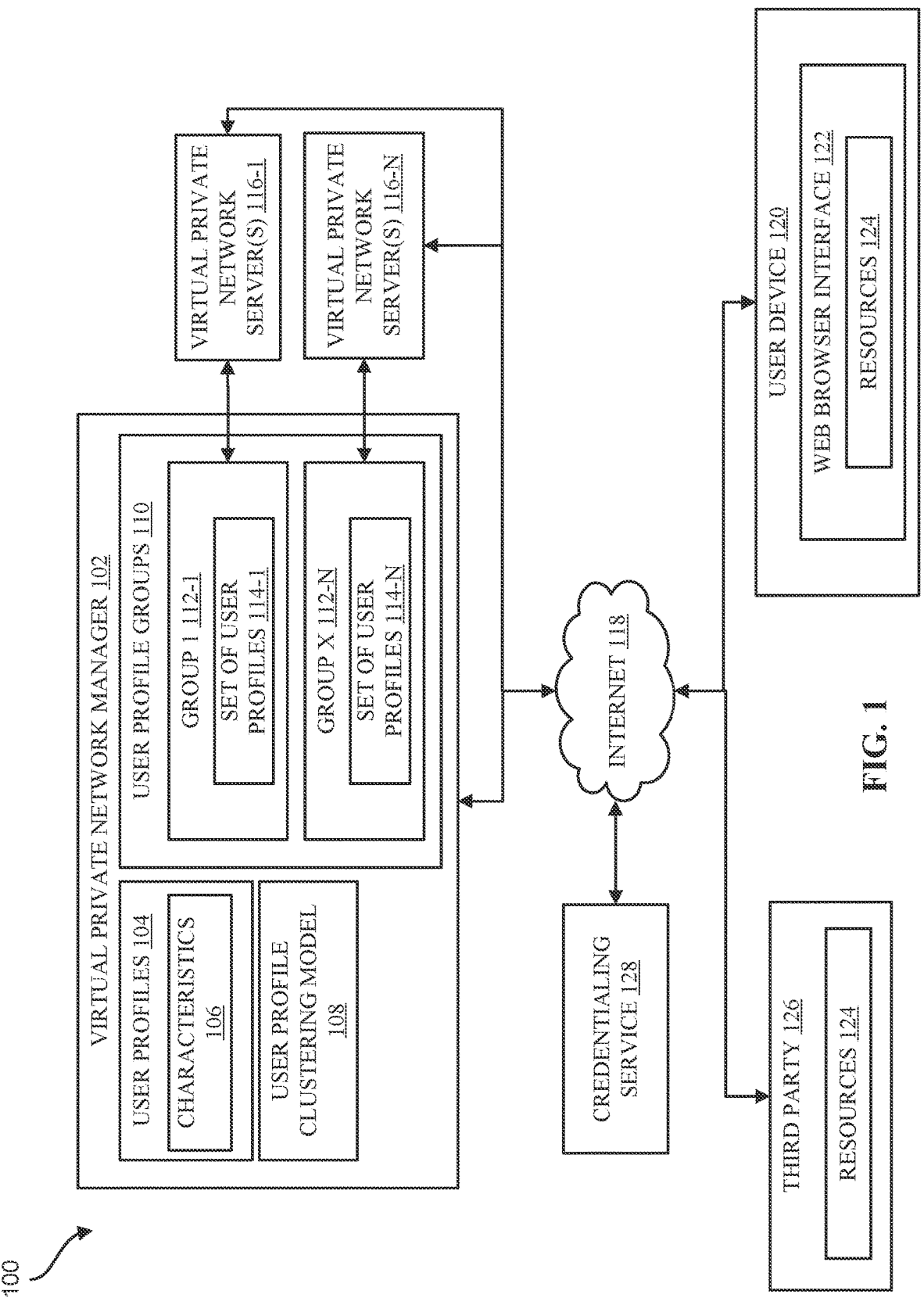
FIG. 1 illustrates a block diagram of an example computational environment including a Virtual Private Network (VPN) manager, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward virtual private networks, and, more specifically, to virtual private networks for similar user profiles. While not limited to such applications, embodiments of the present disclosure may be better understood in light of the aforementioned context.

Traditionally, businesses have relied on web browser cookies to inform targeted online content (e.g., advertisements, hyperlinks, downloadables, sign-up forms, etc.). However, cookies are increasingly ineffective at successfully delivering targeted online content. For example, local, national, and/or international regulations make it increasingly difficult to effectively use cookies. Furthermore, a variety of software exists that enable users to opt-out of, remove, or otherwise avoid cookies. Accordingly, there is a need for safe, compliant, and effective avenues of delivering targeted online content.

At the same time, internet users are exposed to numerous security risks merely by using the internet. Hacking, identity theft, illegal data harvesting (e.g., personal information, financial information, etc.), ransomware, and surveillance are some of the risks that users are exposed to when using the internet. As previously discussed, VPNs are one effective tool at increasing the security of individual internet users by encrypting data and/or obscuring a user's location (e.g., IP address).

Aspects of the present disclosure are directed towards improving web browsing security while also enabling a new mechanism for targeted content delivery. Aspects of the present disclosure include techniques for grouping similar user profiles and associating respective groups with respective VPN resources. In doing so, aspects of the present disclosure can enable secured internet access for groups of users. Further aspects of the present disclosure enable delivery of customized content from third parties (e.g., advertisements, campaigns, public service announcements, notifications, etc.) for respective groups of users, where the customized content can be curated to match the interests of the certain group of users and delivered via the VPN resources associated with the group of users.

Advantageously, aspects of the present disclosure can improve web browsing security for users while offering third parties an effective communication channel to prospective customers, clients, employees, and/or other groups. As one example, VPN resources can be provided to users for free, where the VPN resource provisioning entity can realize a profit by selling a communication channel for targeted content from third parties to users of the VPN resources. As another advantage, aspects of the present disclosure do not use trackers, cookies, or other surveillance devices to monitor user internet browsing as is traditionally done for targeted content delivery. In doing so, aspects of the present disclosure improve the security and privacy of users of the VPN resources. As yet another advantage, aspects of the present disclosure can require users to authenticate with a credentialing service prior to using the VPN resources. Advantageously, the credentialing service improves security by authenticating each user in a group of users utilizing VPN resources, thereby increasing the security of the VPN resource environment for users and increasing the conversion rate of targeted content for third parties (by ensuring the targeted content reaches desired users that have been authenticated to, in fact, be the desired users). Furthermore, use of a separate credentialing service can reduce personal data leakage by only providing necessary information from the credentialing service to the VPN resource provisioning entity (e.g., where the necessary information can exclude personally identifiable information (PII), etc.).

Though this disclosure may implicitly or explicitly refer to the collection of personal data, it is noted that in embodiments, users opt-in to any system collecting and/or sharing personal data. In doing so, they are informed of what data is collected and how it will be used, that any collected personal data may be encrypted while being used, that users can opt-out at any time, and that if they opt-out, any personal data of the user is deleted. Furthermore, any discussion of personal data discussed herein should be construed to comply with any relevant laws and/or standards (e.g., General Data Protection Regulation (GDPR), Health Insurance Portability and Accountability Act (HIPAA), etc.).

Referring now to the figures, FIG. 1 illustrates a block diagram of an example computational environment 100 including a Virtual Private Network (VPN) manager 102, in accordance with some embodiments of the present disclosure. The VPN manager 102 can include user profiles 104 of users that have opted to join the VPN manager 102 for secure access to the internet 118 via one or more VPN servers 116. Each of the user profiles 104 can include characteristics 106. Characteristics 106 can be demographic characteristics and/or other characteristics of user profiles 104 that may be useful for effectively grouping similar user profiles 104. Characteristics 106 can be, but are not limited to, age, gender, location, education level, marital status, parental status, income, occupation, affiliations, hobbies, health-related characteristics, characteristics of an associated user device 120 (e.g., operating system, device type, device model, device browser, device applications, etc.), and/or other characteristics.

User profiles 104 (and their associated characteristics 106) can be input to user profile clustering model 108. User profile clustering model 108 can sort, cluster, group, or otherwise generate user profile groups 110. Any number of user profile groups 110 can be generated such as group 1 112-1 (made up of set of user profiles 114-1) to group N 112-N (made up of set of user profiles 114-N) where N can refer to any positive integer and represent any number of groups generated from the user profiles 104 by the user profile clustering model 108. Respective groups 112 of user profile groups 110 can include a same number, similar number, or different numbers of user profiles 104 in each group. For example, one group can include one-thousand user profiles 104 while another group includes five-hundred user profiles 104.

Referring back to the user profile clustering model 108, it can utilize any number of rules, algorithms, and/or techniques for generating the user profile groups 110. In some embodiments, the user profile clustering model 108 can include any number of machine learning algorithms such as, but not limited to, natural language processing (NLP), decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, user profile clustering model 108 can be configured to perform machine learning on the user profiles 104 (and associated characteristics 106) using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multi-dimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques. After training the user profile clustering model 108, the user profile clustering model 108 can ingest user profiles 104 and output user profile groups 110.

User profiles 104 can be added to the VPN manager 102 by a credentialing service 128. Credentialing service 128 can be a secure entity providing authentication functionality between two or more endpoints, applications, services, others, or a combination of the aforementioned. For example, a user of user device 120 can generate a profile with credentialing service 128. The credentialing service 128 can then pass relevant information of the created profile to the VPN manager 102. Relevant information can be only that information necessary to create user profiles 104 and attendant characteristics 106 at the VPN manager 102. In other words, credentialing service 128 can retain any PII, sensitive information, confidential information, and/or otherwise private information that is not needed by the VPN manager 102. In some embodiments, the credentialing service 128 provides single-sign-on (SSO) capabilities such that future connections between a user device 120 and the VPN servers 116 can be authenticated by the SSO capabilities of the credentialing service 128. Likewise, in some embodiments, credentialing service 128 can utilize multi-factor authentication, biometric authentication, and/or other authentication methods to increase the robustness of the credentialing service 128.

Once authenticated with the credentialing service 128, the VPN manager 102 can add the user profile 104 associated with the user device 120 to one of the groups 112. The VPN manager 102 can then direct the user device 120 to one or more VPN servers 116 associated with the group 112 (e.g., a first set of one or more VPN servers 116-1 associated with group 1 112-1, an N$^{th}$ set of one or more VPN servers 116-N associated with group N 112-N). VPN servers 116 can refer to one or more remote servers and associated software configured to securely relay data through the internet. VPN servers 116 can be configured to encrypt transmitted data and/or obscure an IP address of a user device 120. The user device 120 can then use the VPN servers 116 for accessing the internet 118. For example, the user device 120 can interact with the internet 118 using a web browser interface 122. Furthermore, in some embodiments, a third party 126 interacts with the VPN manager 102 to provide resources 124 to certain groups 112, where the resources 124 can be curated to include relevant information for the certain groups 112. For example, the resources 124 can be, but are not limited to, advertisements, downloadables, hyperlinks, and sign-up forms, among others. The VPN manager 102 can transmit the resources 124 to the appropriate VPN servers 116 for the certain group 112, and the appropriate VPN servers 116 can then display the resources 124 on the web browser interface 122 of user devices 120 utilizing the VPN servers 116.

As will be appreciated by one skilled in the art, FIG. 1 is presented merely for example purposes and numerous other configurations can fall within the spirit and scope of the present disclosure. For example, although each group 112 is shown in a 1:1 relationship with a set of one or more VPN servers 116, in other embodiments, there are many-to-one relationships (e.g., multiple groups 112 for each group of VPN servers 116, or multiple groups of VPN servers 116 for a single group 112). Furthermore, the connections between various components in FIG. 1 should be understood to encompass permanent, semi-permanent, temporary, or singular connections, wireless or wired in nature, that can occur directly or indirectly. Furthermore, although not explicitly shown, the components of FIG. 1 each include any necessary hardware and/or software to function in the computational environment 100. The individual components can represent servers, mainframes, computers (e.g., desktops, laptops, etc.), tablets, smartphones, and/or other computational devices. Furthermore, although the internet 118 is shown in FIG. 1, aspects of the present disclosure can also be implemented on an intranet or other local network.

Figure 2:
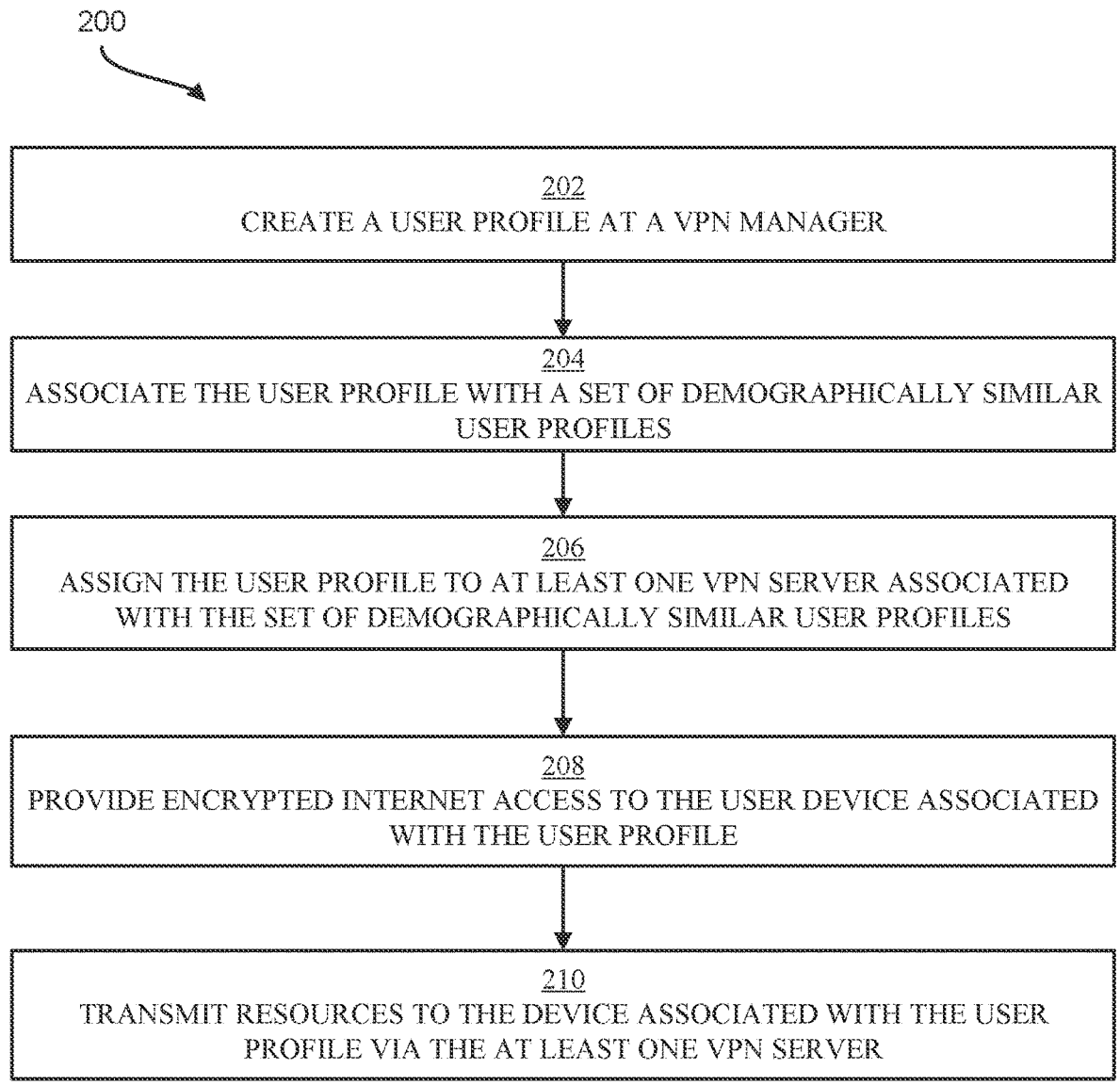
FIG. 2 illustrates a flowchart of an example method for using a VPN manager to provide VPN internet access to groups of users, in accordance with some embodiments of the present disclosure.

FIG. 2 illustrates a flowchart of an example method 200 for using a VPN manager 102 to provide VPN internet access to groups of users, in accordance with some embodiments of the present disclosure. In some embodiments, the method 200 is implemented by a computer, laptop, desktop, tablet, smartphone, processor, and/or another configuration of hardware and/or software. In some embodiments, the method 200 is implemented by one or more components of FIG. 1.

Operation 202 includes creating a user profile 104. The user profile 104 can be created directly with the VPN manager 102 or via a credentialing service 128, in various embodiments. The user profile 104 can include various characteristics 106 useful for effectively grouping user profiles 104.

Operation 204 includes associating the user profile 104 with a set of demographically similar user profiles in a group 112. In some embodiments, operation 204 utilizes a user profile clustering model 108 to associate the user profile 104 with a correct group 112. Operation 204 can statically or dynamically combine user profiles 104 into groups 112. When statically combined, the groups 112 can be relatively unchanging during and between usages (e.g., internet accesses). When dynamically combined, the groups 112 can be recreated at each new login of the user profile 104 (and based on other user profiles 104 using the VPN servers 116) and/or recreated based on details provided by a third-party regarding an ideal group 112 for targeted resources 124.

Operation 206 includes assigning the user profile 104 to at least one VPN server 116 associated with the set of demographically similar user profiles in the assigned group 112. Operation 208 includes providing encrypted internet access to the user device 120 associated with the user profile 104 via the at least one VPN server 116. Advantageously, VPN servers 116 enable relatively more secure and private access to the internet 118.

Operation 210 includes transmitting resources 124 to the user device 120 associated with the user profile 104 via the at least one VPN server 116. The resources 124 can include relevant information for users in the group 112 including the user profile 104. The resources 124 can be provided by a third-party 126. The resources 124 can be presented on a web browser interface 122 associated with the user device 120.

Figure 3:
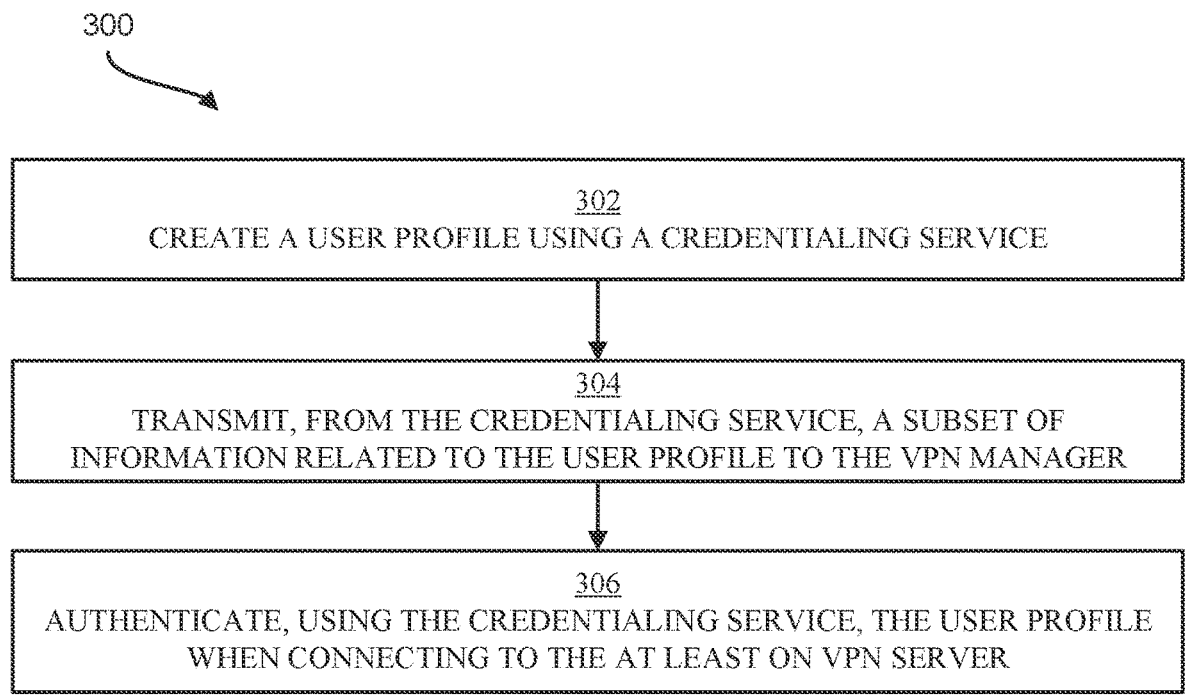
FIG. 3 illustrates a flowchart of an example method for using a credentialing service to generate a user profile for a VPN manager, in accordance with some embodiments of the present disclosure.

FIG. 3 illustrates a flowchart of an example method 300 for using a credentialing service 128 to generate a user profile 104 for the VPN manager 102, in accordance with some embodiments of the present disclosure. In some embodiments, the method 300 is implemented by a computer, laptop, desktop, tablet, smartphone, processor, and/or another configuration of hardware and/or software. In some embodiments, the method 300 is implemented by one or more components of FIG. 1. In some embodiments, the method 300 is a sub-method of operation 202 of FIG. 2.

Operation 302 includes creating a user profile 104 using a credentialing service 128. Operation 304 includes transmitting, from the credentialing service 128, a subset of information related to the user profile 104 to the VPN manager 102. For example, the transmitted subset of information can exclude private, confidential, and/or otherwise unnecessary information such as PII.

Operation 306 includes authenticating, using the credentialing service 128, the user profile 104 when connecting to the at least one VPN server 116. In some embodiments, operation 306 utilizes SSO to authenticate the user profile 104. In some embodiments, operation 306 uses multi-factor authentication and/or biometric authentication to authenticate the user profile 104.

Figure 4:
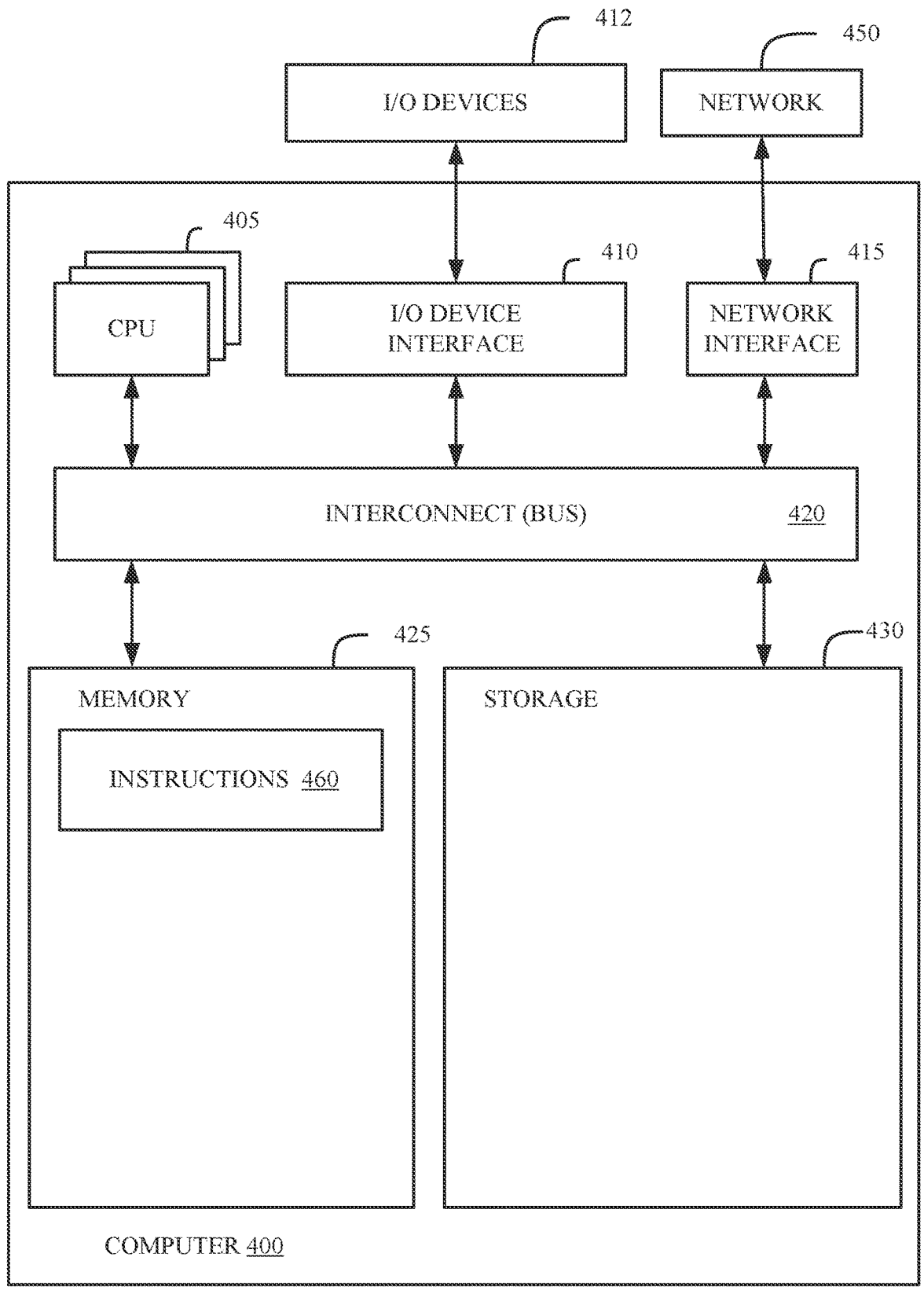
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform any or all portions of the methods described in FIGS. 2-3 and/or implement the functionality discussed in FIG. 1. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine (e.g., VPN manager 102 and/or user device 120 of FIG. 1) such that the client machine executes the method, or a portion of the method, based on the instructions provided by computer 400. In some embodiments, the computer 400 is incorporated into (or functionality similar to computer 400 is virtually provisioned to) one or more entities illustrated in FIG. 1 and/or other aspects of the present disclosure.

Computer 400 includes memory 425, storage 430, interconnect 420 (e.g., a bus), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more buses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random-access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be computer-readable and computer-executable instructions for performing any portion of, or all of, the methods of FIGS. 2-3 and/or implement the functionality discussed in FIG. 1. Although instructions 460 are shown in memory 425, instructions 460 can include program instructions collectively stored across numerous computer-readable storage media and executable by one or more CPUs 405.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
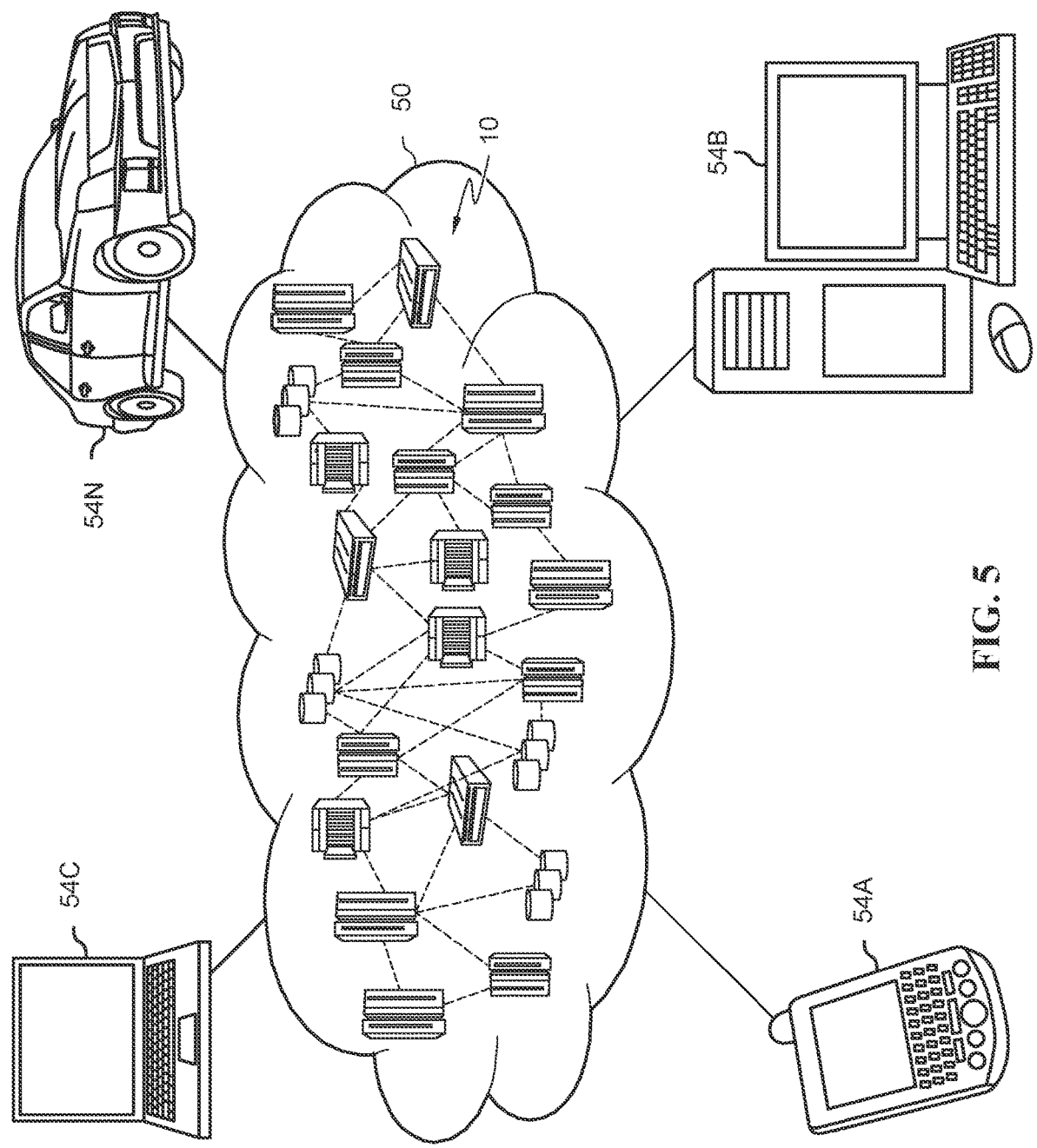
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
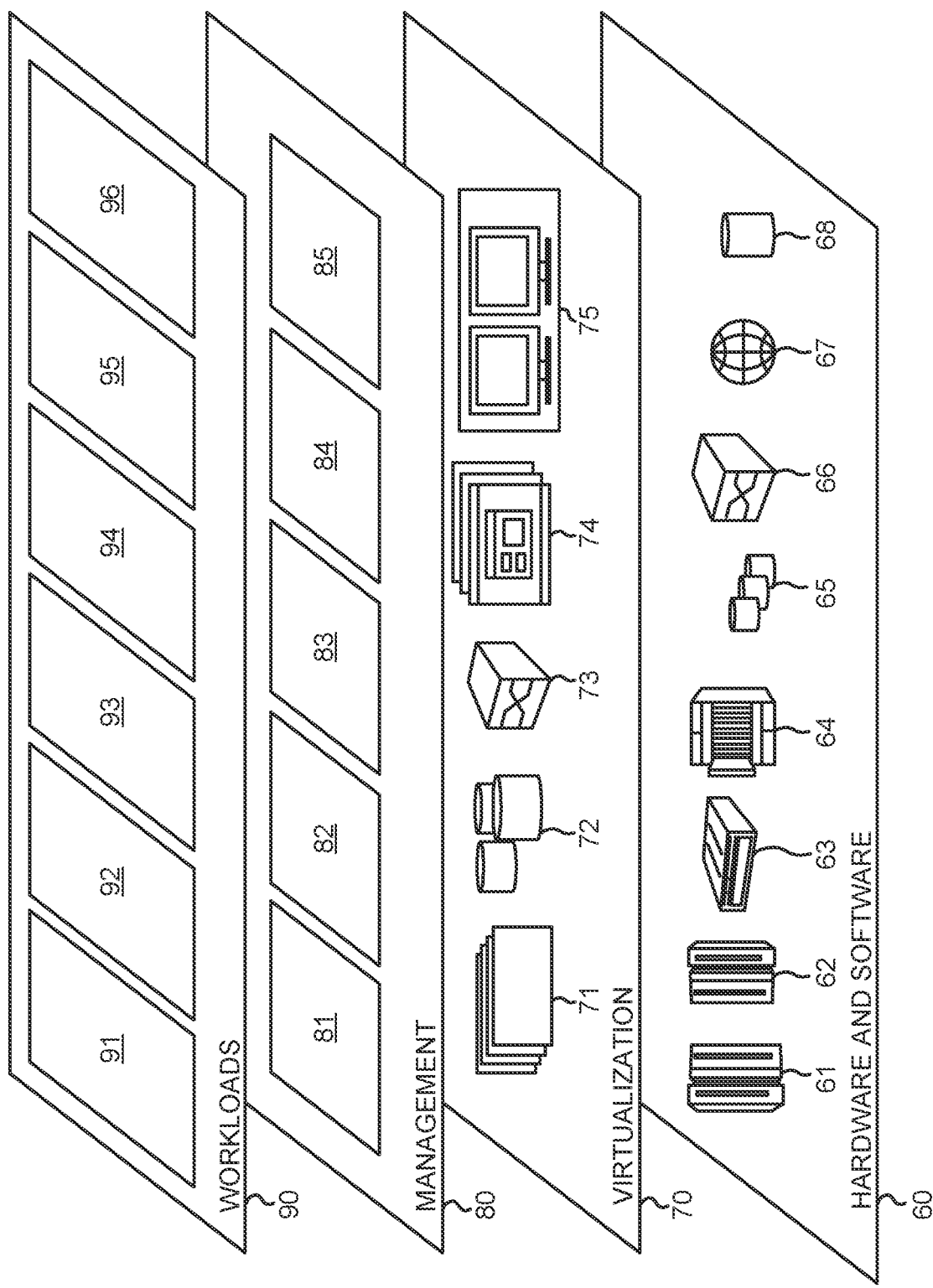
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VPNs for similarly credentialed profiles 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any portion of the methods described with respect to FIGS. 2-3 and/or implement the functionality discussed in FIG. 1 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method for grouping user profiles onto Virtual Private Networks (VPNs), the computer-implemented method comprising: creating a user profile at a VPN manager; associating the user profile with a set of demographically similar user profiles based on characteristics of the user profile; assigning the user profile to least one VPN server that is associated with the set of demographically similar user profiles; providing encrypted internet access to a device associated with the user profile via the at least on VPN server; and transmitting resources to the device associated with the user profile via the at least one VPN server, wherein the resources are customized for the set of demographically similar user profiles.

Example 2 includes the method of example 1, including or excluding optional features. In this example, the characteristics of the user profile are selected from a group consisting of: location, age, gender, occupation, education level, income, hobbies, health-related information, device operating system, device type, and device model.

Example 3 includes the method of any one of examples 1-2, including or excluding optional features. In this example, creating the user profile at the VPN manager further comprises: creating the user profile at a credentialing service; and transmitting, from the credentialing service, a subset of information related to the user profile to the VPN manager. Optionally, the credentialing service authenticates the user profile prior to respective connections to the at least one VPN server.

Example 4 includes the method of any one of examples 1-3, including or excluding optional features. In this example, the resources are selected from a group consisting of: advertisements, downloadables, hyperlinks, and sign-up forms.

Example 5 includes the method of any one of examples 1-4, including or excluding optional features. In this example, the resources are presented in a web browser of the device associated with the user profile.

Example 6 includes the method of any one of examples 1-5, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 7 is a system. The system includes one or more computer readable storage media storing program instructions; and one or more processors which, in response to executing the program instructions, are configured to perform a method according to any one of examples 1-6, including or excluding optional features.

Example 8 is a computer program product. The computer program product includes one or more computer readable storage media, and program instructions collectively stored on the one or more computer readable storage media, the program instructions comprising instructions configured to cause one or more processors to perform a method according to any one of examples 1-6, including or excluding optional features.

What is claimed is:

1. A computer-implemented method for grouping user profiles onto Virtual Private Networks (VPNs), the computer-implemented method comprising:
creating a user profile at a VPN manager;
dynamically associating, in response to respective logins of the user profile to the VPN manager, the user profile with a respective set of demographically similar user profiles based on location, age, and health-related information of the user profile;
assigning the user profile to at least one VPN server that is associated with the respective set of demographically similar user profiles;

providing encrypted internet access to a device associated with the user profile via the at least one VPN server; and transmitting resources to the device associated with the user profile via the at least one VPN server, wherein the resources are customized for the respective set of demographically similar user profiles.

2. The computer-implemented method of claim 1, wherein dynamically associating the user profile with the respective set of demographically similar user profiles is further based on gender, occupation, education level, income, hobbies, device operating system, device type, and device model.

3. The computer-implemented method of claim 1, wherein creating the user profile at the VPN manager further comprises:

creating the user profile at a credentialing service; and transmitting, from the credentialing service, a subset of information related to the user profile to the VPN manager.

4. The computer-implemented method of claim 3, wherein the credentialing service authenticates the user profile prior to respective connections to the at least one VPN server.

5. The computer-implemented method of claim 1, wherein the resources are selected from a group consisting of: advertisements, downloadables, hyperlinks, and sign-up forms.

6. The computer-implemented method of claim 1, wherein the resources are presented in a web browser of the device associated with the user profile.

7. The computer-implemented method of claim 1, wherein the method is performed by one or more computers according to software that is downloaded to the one or more computers from a remote data processing system.

8. The computer-implemented method of claim 7, wherein the method further comprises:

metering a usage of the software; and generating an invoice based on metering the usage.

9. A system comprising:

one or more computer readable storage media storing program instructions; and one or more processors which, in response to executing the program instructions, are configured to perform a method comprising:

creating a user profile at a VPN manager;

dynamically associating, in response to respective logins of the user profile to the VPN manager, the user profile with a respective set of demographically similar user profiles based on age, gender, and health-related information of the user profile;

assigning the user profile to at least one VPN server that is associated with the respective set of demographically similar user profiles;

providing encrypted internet access to a device associated with the user profile via the at least one VPN server; and transmitting resources to the device associated with the user profile via the at least one VPN server, wherein the resources are customized for the respective set of demographically similar user profiles.

10. The system of claim 9, wherein dynamically associating the user profile with the respective set of demographically similar user profiles is further based on device operating system, device type, and device model.

11. The system of claim 9, wherein creating the user profile at the VPN manager further comprises:

creating the user profile at a credentialing service; and transmitting, from the credentialing service, a subset of information related to the user profile to the VPN manager.

12. The system of claim 11, wherein the credentialing service authenticates the user profile prior to respective connections to the at least one VPN server.

13. The system of claim 9, wherein the resources are selected from a group consisting of: advertisements, downloadables, hyperlinks, and sign-up forms.

14. The system of claim 9, wherein the resources are presented in a web browser of the device associated with the user profile.

15. A computer program product comprising one or more computer readable storage media, and program instructions collectively stored on the one or more computer readable storage media, the program instructions comprising instructions configured to cause one or more processors to perform a method comprising:

creating a user profile at a VPN manager;

dynamically associating, in response to respective logins of the user profile to the VPN manager, the user profile with a respective set of demographically similar user profiles based on location, age, and gender of the user profile;

assigning the user profile to at least one VPN server that is associated with the respective set of demographically similar user profiles;

providing encrypted internet access to a device associated with the user profile via the at least one VPN server; and transmitting resources to the device associated with the user profile via the at least one VPN server, wherein the resources are customized for the respective set of demographically similar user profiles.

16. The computer program product of claim 15, wherein dynamically associating the user profile with the respective set of demographically similar user profiles is further based on health-related information.

17. The computer program product of claim 15, wherein creating the user profile at the VPN manager further comprises:

creating the user profile at a credentialing service; and transmitting, from the credentialing service, a subset of information related to the user profile to the VPN manager.

18. The computer program product of claim 17, wherein the credentialing service authenticates the user profile prior to respective connections to the at least one VPN server.

19. The computer program product of claim 15, wherein the resources are selected from a group consisting of: advertisements, downloadables, hyperlinks, and sign-up forms.

20. The computer program product of claim 15, wherein the resources are presented in a web browser of the device associated with the user profile.

* * * * *